United States Patent [19]

Allegrezza, Jr. et al.

[11] Patent Number: 4,824,568
[45] Date of Patent: Apr. 25, 1989

[54] COMPOSITE ULTRAFILTRATION MEMBRANES

[75] Inventors: Anthony E. Allegrezza, Jr., Milford; Edmund T. Burke, Winchester, both of Mass.

[73] Assignee: Millipore Corporation, Bedford, Mass.

[21] Appl. No.: 864,074

[22] Filed: May 16, 1986

[51] Int. Cl.$^4$ ............................................. B01D 13/00
[52] U.S. Cl. .............................. 210/490; 210/500.41; 210/500.42; 427/246
[58] Field of Search .............. 210/490, 500.41, 500.42, 210/506; 427/244, 245, 246

[56] References Cited

U.S. PATENT DOCUMENTS

| | | | |
|---|---|---|---|
| 3,762,566 | 10/1973 | Del Pico | 210/490 |
| 4,071,590 | 1/1978 | Strathmann | 264/41 X |
| 4,388,189 | 6/1983 | Kawaguchi et al. | 210/490 |
| 4,473,474 | 9/1984 | Ostreicher et al. | 210/636 |
| 4,543,221 | 9/1985 | Chen et al. | 210/500.23 X |

*Primary Examiner*—Frank Spear
*Attorney, Agent, or Firm*—Hamilton, Brook, Smith & Reynolds

[57] ABSTRACT

Composite ultrafiltration membranes are disclosed which are produced by forming an ultrafiltration membrane structure on a preformed microporous membrane.

17 Claims, 7 Drawing Sheets

FIG. 1

FIG. 2
COMPOSITE ULTRAFILTRATION MEMBRANES CAST ON VARIOUS SUBSTRATES.

COMPOSITE ULTRAFILTRATION MEMBRANES

Ultrafiltration is a pressure-driven membrane transport process that has been applied, on both the laboratory and industrial scale, for separation, concentration, fractionation, etc. of macromolecular or colloidal solutes or particles. Typically, the separation occurs in the liquid phase and the solutes may be of either lyophilic or lyophobic character. The solute size is roughly 20–1000 Å.

There have been long and continuous efforts to develop membranes suitable for use in ultrafiltration. The first such membranes were produced in 1907 by Bechhold, who coined the term "ultrafiltration". H. Bechhold, *Z. Phys. Chem.*, 60, 257 (1907). Since Bechhold's original membranes, there has been continuous effort to develop new ultrafiltration membranes which has resulted in many diverse types of such membranes. Today, the following membrane types predominate in commercial practical use: asymmetric skinned membranes made from synthetic polymers, co-polymers or blends by the "phase-inversion" method; inorganic membranes, utilizing inorganic porous supports and inorganic colloids, such as $ZrO_2$ or alumina with appropriate binders; melt-spun, "thermal inversion" membranes; "composite" and "dynamic" membranes with selective layers formed in situ; stretched films of polymers, such as those formed from stretched isotactic polypropylene; and track-etched membranes, such as Nucleopore polycarbonate filters manufactured and marketed by Nuclepore Corp. In addition, some ultrafiltration membranes are extensions of the microfiltration and reverse osmosis membrane technologies. More detailed descriptions of the fabrication of ultrafiltration membranes is presented in the following references: (1) Pusch, W. and Walch, A., "Synthetic Membranes-Preparation, Structure, and Application," *Angew. Chem. Int. Ed. Engl.*, 21 (1982), pp. 660–85; and (2) Walch, A., "Preparation and Structure of Synthetic Membranes," *Desalination*, 46 (1983), pp. 303–12.

Currently, the great majority of industrial ultrafiltration membranes are asymmetric skinned membranes. Such membranes have structural discontinuity between the skin layer, which may be less than 0.1 micrometers thick, and the sublayer "matrix". They also contain relatively large, often elongated voids, sometimes described as "finger structures," throughout the membrane matrix. Specific examples of commercially available asymmetric skinned ultrafiltration membranes are polysulfone membranes having an overall thickness of about 70–80 micrometers and a very thin skin layer, e.g. about 0.1 micrometers, with varying pore size distributions in the skin layers depending upon the molecular weight cutoff desired. Such ultrafiltration membranes are marketed by Millipore Corporation, Bedford, Mass.

Ultrafiltration membranes are typically produced by casting a homogeneous polymer solution as a thin layer on an appropriate support and thereafter transforming the polymer solution into a two-phase system. Typical supports employed are woven or non-woven fabrics. Phase separation of the polymer solution occurs through very fast nucleation and growth of a second phase. Precipitation of the polymer solution is brought about by a variety of techniques. These include: immersion precipitation wherein the membrane is coagulated in a non-solvent bath; thermal precipitation, where the polymer solution is coagulated by means of temperature changes, typically cooling; evaporation precipitation, wherein the volatile polymer solvent is removed; and vapor-phase precipitation, wherein a precipitant diffuses in the solution from the vapor phase.

Immersion precipitation appears to be the most common method used for ultrafiltration membrane formation. In immersion precipitation, coagulation bath liquids can often easily penetrate through a nascent skin of the membrane and form the characteristic voids. Driving forces for void formation are a very spontaneous mixing of solvent and non-solvent, and spontaneous syneresis of the polymer-rich structures around the void.

A problem which has existed with ultrafiltration membranes previously produced is the lack of structural integrity of the thin skin. For example, ultrafiltration membranes have been known to have low bubble points or bubble points which are not reproduceable. Bubble point testing is a traditional technique for evaluating the integrity of membrane filters which have discrete, uniform passages penetrating from one side to the other which can be thought of as fine uniform capillaries. The bubble point test is based on the fact that liquid is held in these capillary tubes by surface tension and that the minimum pressure required to force liquid out of the tubes is a measure of tube diameter. This lack of membrane integrity has limited the use of ultrafiltration membranes in certain applications, particularly sterilization procedures.

SUMMARY OF THE INVENTION

This invention relates to composite ultrafiltration membranes. Such composite membranes consist essentially of an ultrafiltration membrane structure superimposed on a pre-formed microporous membrane structure.

Surprisingly, the composite ultrafiltration membranes described herein have been found to possess significantly superior membrane integrity compared to traditional ultrafiltration membranes. The increase in membrane integrity is achieved without sacrificing other ultrafiltration membrane properties such as water flux and molecular weight rejection properties.

DETAILED DESCRIPTION OF THE INVENTION

The invention will now be further described with particular reference to the Figures. The drawings are not necessarily to scale, emphasis instead being placed upon illustrating the principles of the invention, particularly the preferred embodiments thereof.

Figure 1:
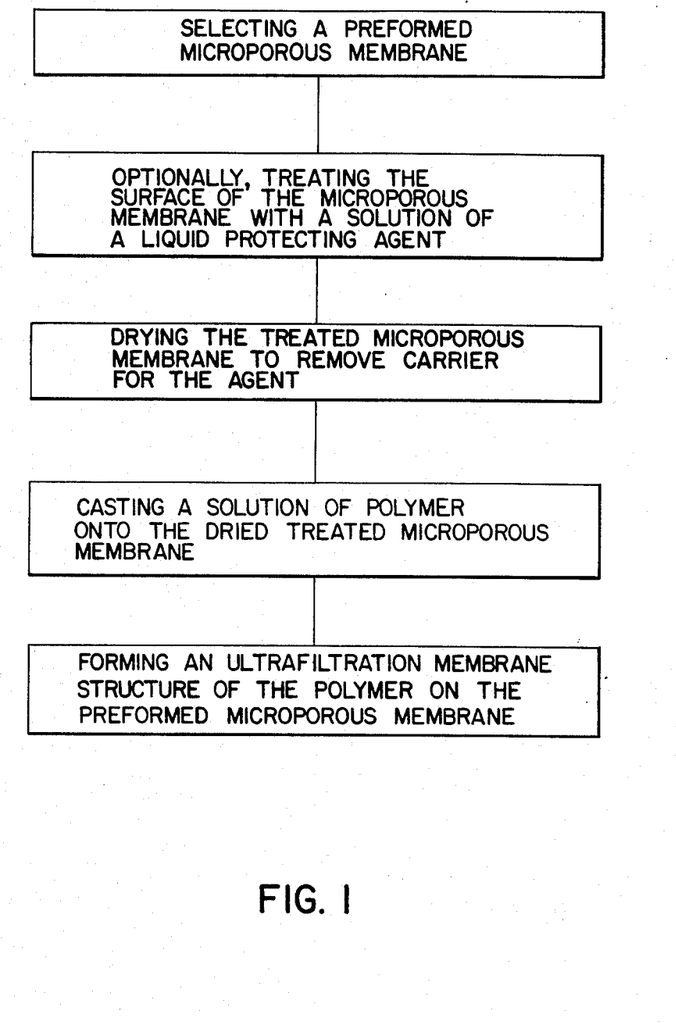
FIG. 1 is a block diagram generally illustrating the steps in the method of this invention.

FIG. 1 illustrates generally the steps of a preferred method for producing composite ultrafiltration membranes according to this invention.

Initially, a preformed microporous membrane is selected. Microporous membranes are generally formed from synthetic thermoplastic materials and have a substantially continuous matrix structure containing pores or channels of small size. Although the size range for pores of microporous membranes is not universally and precisely defined, it is generally understood to mean pore sizes ranging from about 0.05 to about 10 micrometers. meters.

A wide variety of polymeric materials have been employed to produce microporous membranes. Examples of these polymers include: polyolefins such as low density polyethylene, high density polyethylene, and polypropylene; vinyl polymers; acrylic polymers such as polymethylmethacrylate and polymethylacrylate; oxidation polymers such as polyphenylene oxide; fluoropolymers, such as polytetrafluoroethylene and polyvinylidene fluoride; and condensation polymers such as polyethylene terephthalate, nylons, polycarbonates and polysulfones.

Optionally, the pore surfaces of the microporous membrane structure are treated with a liquid protecting agent to minimize or prevent the polymer solvent employed in subsequent coating steps from attacking these surfaces and from penetrating into the membrane. In the case of microporous membranes formed from polyvinylidene difluoride (PVDF), such as Durapore ® membranes marketed by Millipore Corporation, Bedford, Mass., it has been found that treatment with glycerine is suitable. For example, a Durapore ® membrane can be immersed in a solution of glycerine. Alternatively, the membrane could be run as a web over a rotating coating roll having its lower portion immersed in a solution of glycerine.

Liquid protecting agents other than glycerine can be employed, of course. For example, glycols such as ethylene glycol, propylene glycol, triethylene glycol, etc., are also suitable. Usually, it is preferable to select an agent which is miscible with water because this facilitates removal of agent in a water bath often used in membrane fabrication to extract from the membrane solvents and other materials employed in forming the membrane. Those skilled in the art will know, or be able to ascertain using routine experimentation, additional liquid protecting agents.

The liquid agents can be dissolved in solutions, such as alcohol solutions. This facilitates application of the agent and the alcohol can be removed by subsequent drying.

In general, an amount of agent is employed which is sufficient to provide the preformed microporous membrane with significant protection against attack from the polymer solvents employed in forming the ultrafiltration membrane and to provide significant protection against membrane penetration by such solvents. The upper amount is determined by practical considerations. For example, it has been observed that too much glycerine can result in lower adhesion of the ultrafiltration membrane subsequently formed. Cost of the agent is another practical consideration. In treating Durapore ® membranes with glycerine, it has been determined that a preferred treating solution comprises from about 15% to about 40%, by weight, of glycerine in isopropanol.

Treating agents that are not liquids could also be employed. For example, water soluble waxes, such as polyethylene oxides, could be melted and applied to the microporous membrane and removed, if desired, subsequently in the processing with a water bath.

The treated microporous membrane is dried to remove any carrier for the agent, e.g., isopropanol. Drying can be accomplished by conveying the treated membrane over heated rolls, passing it through a heated convection oven, or by other techniques.

An ultrafiltration membrane is then formed upon the treated microporous membrane structure. This can be done by coating a polymer solution onto the treated microporous membrane and quickly immersing the coated membrane into a liquid which is miscible with the solvent but is a non-solvent for the polymer. A particularly preferred polymer for the ultrafiltration membrane is PVDF, particularly when the microporous membrane is formed from PVDF. Although usually desirable, it is not necessary to form the ultrafiltration membrane from the same polymer forming the microporous membrane. However, in the preferred formation of membranes, the polymer forming the ultrafiltration membrane is the same as the polymer forming the microporous membrane. In the particularly preferred embodiment, both polymers are PVDF.

An example of a coating technique for the polymer solution is a knife over roll process. Such a process is described in "Coating and Laminating Machines" by H. L. Weiss published by Converting Technology Co., Milwaukee, Wis. (1977), the teachings of which are hereby incorporated by reference. Other coating techniques could, of course, be employed.

Polymer solutions containing 8-20%, by weight, of PVDF in a solvent have been employed. Such solutions have been coated to a dry thickness of from about 5 microns to 50 microns. Other concentrations and thicknesses are possible.

After the polymer solution has been cast onto the microporous membrane, the ultrafiltration membrane structure is formed by immersing the coated microporous structure into a liquid which is miscible with the polymer solvent but is a non-solvent for the dissolved polymer. Water is the preferred liquid, although other liquids can be employed. For example, water-alcohol, water-polymer solvent, water-glycerine mixtures could be employed.

Membrane formation occurs by precipitation of the polymer from the polymer solution. The precipitated polymer forms a porous membrane having a "skinned" or asymmetric structure typical of ultrafiltration membranes. The properties of the membrane can be varied by controlling such parameters as the percent polymer in solution, solvent type, pore forming additives, coating thickness, immersion bath composition, immersion bath temperature, etc.

After the ultrafiltration membrane structure has formed, a composite web is prewashed by conveying the coated and precipitated web through a water bath. Contact time of approximately one minute in 25° C. water is sufficient.

Drying can then be performed by leaving the prewashed web to dry as single sheets at room temperature. Alternatively, the web can be continuously dried by conveying the web over a perforated roll. The interior of the roll is kept at subatmospheric pressure and a heated air stream (e.g., 130° F.) is impinged on the surface of the web. A typical speed for the web over such a roll is 4 feet per minute.

The structure of the composite ultrafiltration membranes prepared according to this invention is unique. This structure is described in more detail below with regard to the specific examples and the photomicrographs shown in the Figures. In general, however, this structure has the thin skin and elongated voids characteristic of ultrafiltration membranes and the fine and uniform pore structure of a microporous membrane. Preferred composite membranes, such as those formed with a PVDF ultrafiltration membrane on a PVDF microporous membrane, have an intermediate or transition zone having an even finer pore structure than the microporous membrane.

Composite ultrafiltration membranes according to this invention are, in general, useful in all established applications for ultrafiltration membranes, as well as in new applications. Such established applications include, for example, electrophoretic paint recovery, treatment of oil-water emulsions, use in the dairy industry to concentrate cheese whey protein, filtration of various food products, and such biotechnology applications as cell harvesting, enzyme purification, dehydrogenation of injectable drugs, etc. Additionally, the superior membrane integrity of the composite ultrafiltration membranes allows them to be used in new applications for such membranes, including those applications involving sterilization of solutions.

The invention will now be more specifically illustrated with the following examples. All parts are by weight unless otherwise specified.

EXAMPLE 1

A Durapore ® microporous membrane having an average pore size of 0.22 micrometers and marketed by Millipore Corporation, Bedford, Mass. was employed as the preformed microporous membrane.

The microporous membrane was saturated with a 30% glycerine in isopropanol alcohol solution by running the membrane over a roll wetted with this solution. Subsequently, the membrane was dried in a convective oven until essentially all isopropanol was removed.

A polymer solution containing 10% polyvinylidene difluoride (PVDF) and 3% lithium choloride in dimethyl acetamide (Kynar 741, Pennwalt Corporation, Philadelphia, Pa.) was cast onto the Durapore ® microporous membrane at a speed of 15 feet per minute. The coated membrane was then immersed in a water bath maintained at a temperature of 10° C. The air exposure between the coating knife and immersion bath was 3 inches. The composite membrane was prewashed and immersed in a water bath maintained at 25° for one minute and was subsequently dried by conveying the prewashed web over a perforated drying roll having subatmospheric pressure and a heated air stream (130° F.) impinging on the surface of the web which was moving at 4 feet per minute.

The composite ultrafiltration membrane formed was characterized by water flux, visual and porosimetry bubble points and by dextran rejection properties. The test methods were performed as follows:

Water Flux

This test is carried out using an Amicon (Amicon Corp., Lexington, Mass.) stirred cell, model 52. A wetted membrane is placed in the cell. The cell is filled with deionized water, connected to a pressurized air supply, and pressurized to 25 psig. Effluent is collected over a standard test time and the flux calculated using the known membrane area.

Visual and Porosimetry Bubble Points

The bubble point test is used to determine the maximum pore size of a permeable membrane. The test is based on the fact that liquid is held in the membrane pores by surface tension effects. The minimum pressure required to force liquid out of the pores is a measure of pore diameter as described by the Washburn equation $P = k4\delta \cos\theta/d$
$P$ = Bubble point pressure
$\delta$ = surface tension
$\theta$ = liquid/solid contact angle
$d$ = pore diameter
$k$ = shape correction factor

1. Visual Bubble Point

ASTM Method 316-80 is employed. In general, this bubble point test is performed by prewetting the filter with the liquid to be used, increasing the pressure of air upstream of the filter and watching for bubbles—downstream—to indicate the passage of air through the membrane. The pressure at which a continuous stream of bubbles appears is the visual bubble point.

2. Porosimetry Bubble Point

This test is conducted on an apparatus similar to that described by Badenhop et al, "Membrane Science and Technology", J. E. Flynn, Ed., Plenum Press (1970).

When air flows through a dry membrane, all pores, no matter what size, are open. When air pressure is applied on an initially wet membrane, flow will occur only through those pores whose bubble pressures are lower or equal to the actual pressure at that moment. Because only open pores allow air passage, the ratio (R) at each corresponding pressure indicates a fraction of open "flow pores". The term "flow pore" is used to emphasize that the measurement is based on volume of fluid flow. Thus the fraction is not a pure pore number fraction but rather one that has already been modified hydrodynamically to account for power law relationship between flow volume and pore size. A plot of the first derivative of the wet/dry flow ratio (dR/dP) vs. P provides a "bubble pressure" distribution. If bubble pressure can be correlated to actual pore size by the equation set forth above or other empirical method, the curve of dR/dP vs. P can be considered as a "pore-size distribution".

Dextran Rejection Testing

This test is based upon methods published by L. Zeman and M. Wales, "Separation Science and Technology" 16(3) p275-390 (1981).

A sample of wetted membrane is placed in a test cell. Pressurized feed containing a mixture of dextrans having nominal molecular weights from 10,000 to 2,000,000 Daltons is contacted in a continuous flow mode with the upstream side of the membrane. The permeation rate is controlled by a peristalic pump in order to run at low flux, and thereby eliminate concentration polarization on the feed side.

Samples of the permeate are examined for their molecular weight distribution (MWD) by size exclusion chromatography. The resulting distribution is compared to the MWD of the feed solution. A rejection at any elution volume can be calculated from $$R_2 = \frac{h(f)_v - h(p)_v}{h(f)_v}$$

where h(f) is the height of the feed solution chromatograph at elution volume v, and h(p)$_v$ is that of the permeate solution at volume v. In this way a distribution of rejections as a function of v can be found. The relation between elution volume and molecular weight of the solute is determined from the known MWD supplied by the manufacturer of the dextran. Molecular size can be calculated from the molecular weights by the relation of Granath and Kuist, J. Chromatography 28 p69–81 (1967). In this way a rejection us size distribution curve is generated.

T40, T70, T500 rejections are calculated rejections for 40,00, 70,000 and 500,000 molecular weight dextrans.

The composite ultrafiltration membrane produced had a water flux of 2000 gal/ft$^2$/day (gfd); a porosimetry bubble point of 56; a visual methanol bubble point of 36; a T40, T70 and T500 Dextran rejections of 24, 34 and 61, respectively.

EXAMPLE 2

The procedure of Example 1 was employed except that the polyvinylidene difluoride casting solution contained 12% polymer, and a Durapore ® microporous membrane having an average pore diameter of 0.45 micrometers was employed. A composite ultrafiltration membrane was produced having a water flux of 3000 gfd, porosimetry bubble point of 55; visual methanol bubble point of 36; and Dextran rejections at T40, T70 and T500 of 24, 26 and 51, respectively.

EXAMPLE 3

The procedure of Example 1 was employed except that the casting solution and microporous membrane structure was varied. Additionally, the polymer solutions were cast onto Hollytex 3329 substrates for comparison. Hollytex 3329 is a non-woven polyethylene terephthalate fabric produced by Filtration Sciences, Holly Springs, Pa., which is often employed as a support in the formation of ultrafiltration membranes. The results are set forth below in Table 1.

are the peak bubble points for Durapore ® 0.22 and 0.45 micron membranes.

As can be seen, the bubble points for the composite ultrafiltration membranes are higher than those of the Durapore ® microporous membranes and higher than UF membranes having equivalent T-70 rejections, i.e. equivalently performing UF membranes.

Figure 2:
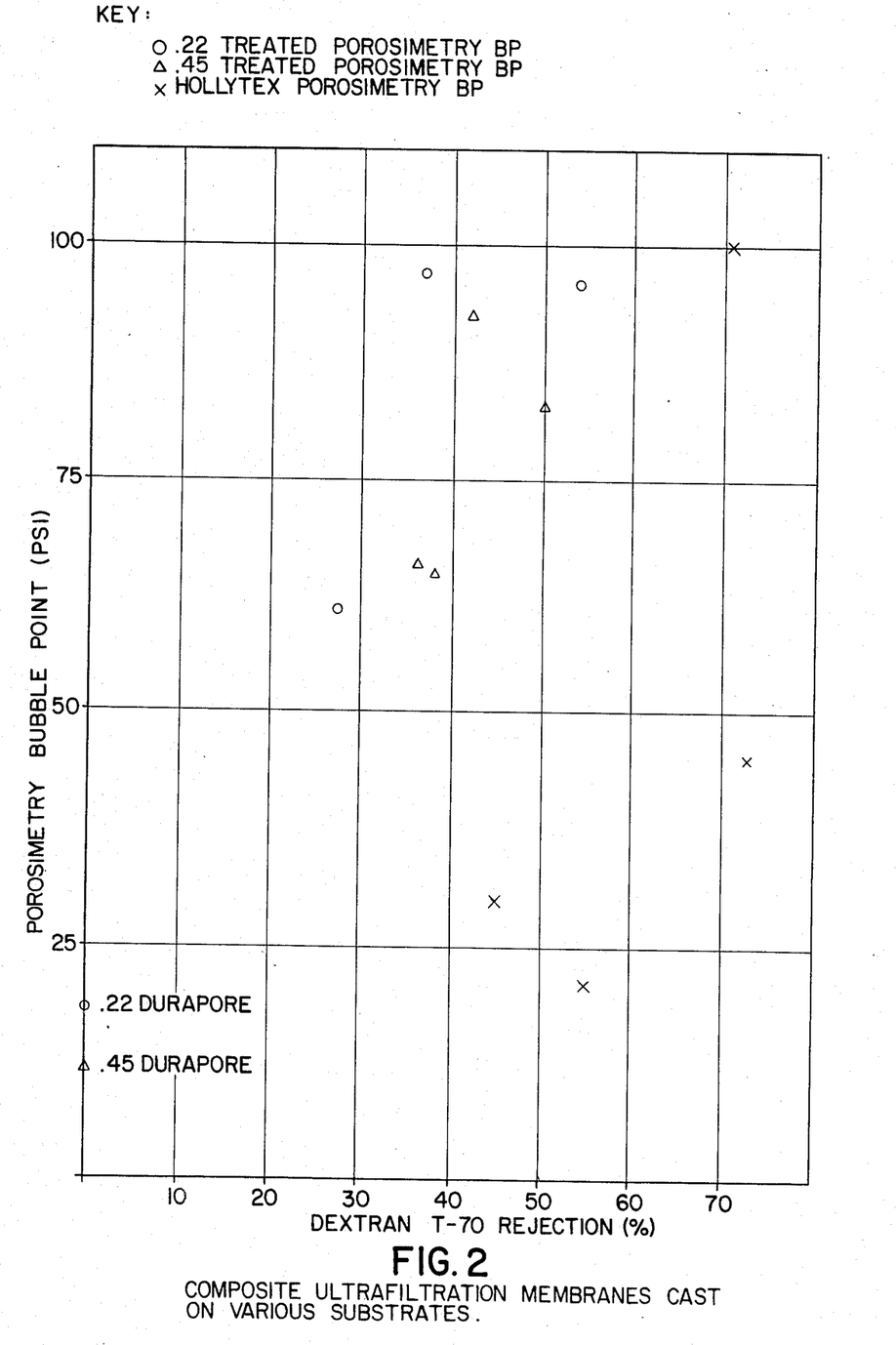
FIG. 2 is a plot of the porosimetry bubble point as a function of T-70 dextran rejection for a composite ultrafiltration membrane produced according to this invention.

The composite membranes are unusual in that the coated membranes are improved over separate membranes in series. For example, if an ultrafiltration membrane were placed upon a microporous membrane, and the combination bubble tested, the resulting bubble point would be that of the higher of the two. For the composite membranes, the bubble point is higher than either taken separately, as shown in FIG. 2.

Figure 3:
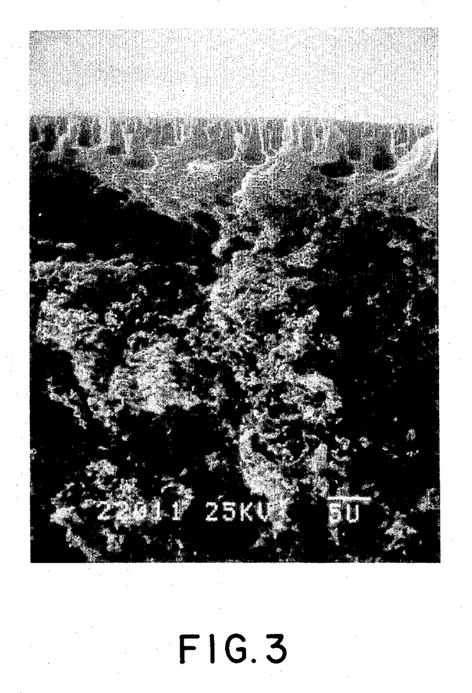
FIGS. 3–7 are scanning electron photomicrographs of composite ultrafiltration membranes.
Figure 4:
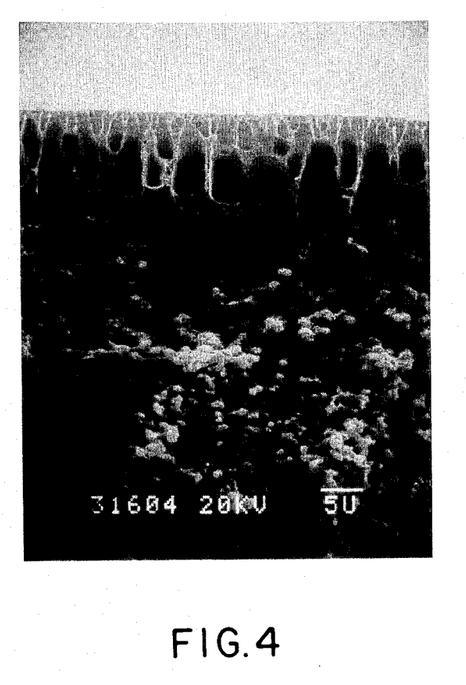
Figure 5:
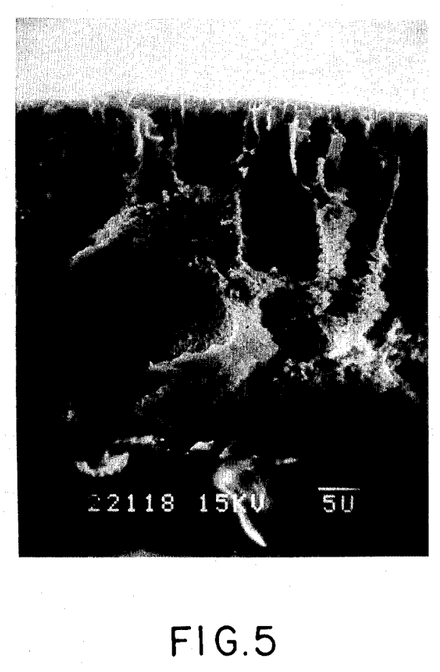

Scanning electron photomicrographs of cross-sections of the three membranes produced with 20% polymer solutions at 2000× are shown in FIGS. 3–5. The photomicrographs show distinct differences between the PVDF backed membranes and non-woven backed membranes. The voids, the long open volumes that start just under the skin and extend into the interior of the membrane, are smaller for the PVDF backed membranes. Additionally, the PVDF backed membranes have a "transition zone" of membrane formed under the voids and extending into the microporous membrane portion. No similar uniform zone is seen for the Hollytex backed membranes.

The smaller voids may lead to fewer defects in the membrane. The transition zone, which has a finer structure than the preformed microporous membrane, will act as a backup filter for particles that pass through the skin surface of the composite ultrafiltration membrane.

EXAMPLE 4

The improved bubble point plays an important role in terms of bacteria retention which is critical in sterilization applications. Examples of 0.45 Durapore ® coated

TABLE 1

| Casting Formulation | .22 Durapore Treated | | | | | | .45 Durapore Treated | | | | | | Hollytex 3329 | | | | | |
|---|---|---|---|---|---|---|---|---|---|---|---|---|---|---|---|---|---|---|
| | Flux[1] | BP[2] | BP[3] | % Rejection[4] | | | Flux[1] | BP[2] | BP[3] | % Rejection[4] | | | Flux[1] | BP[2] | BP[3] | % Rejection[4] | | |
| | (gfd) | (psi) | (psi) | T40 | T70 | T500 | (gfd) | (psi) | (psi) | T40 | T70 | T500 | (gfd) | (psi) | (psi) | T40 | T70 | T500 |
| 14% K741/3% Li | 1600 | 61 | 47 | 18 | 28 | 55 | 3400 | 66 | 45 | 27 | 36 | 60 | 3300 | 21 | 7 | 41 | 55 | 77 |
| 16% K741/3% Li | 1600 | 97 | 60 | 26 | 37 | 61 | 3600 | 65 | 43 | 25 | 38 | 60 | 3400 | 30 | 12 | 33 | 45 | 69 |
| 16% K741 | 740 | 96 | 64 | 41 | 54 | 77 | 1900 | 83 | 53 | 40 | 50 | 72 | 1645 | 45 | 43 | 62 | 73 | 87 |
| 20% K741/3% Li | 180 | ↑100 | 98 | 50 | 62 | 80 | 330 | 93 | 760 | 32 | 42 | 64 | 1025 | 100 | 55 | 53 | 65 | 83 |

[1]water flux at 25 psi
[2]porosimetry peak bubble point
[3]visual bubble point
[4]calculated from Dextran rejection testing.

This data indicate that the composite membranes had higher peak porosimetry bubble points at given T70 rejections compared to Hollytex backed membranes. The water flux decreased and the bubble points and rejections generally increased with increasing polymer solids. The more open Durapore ® substrate (0.45) produced membranes with higher fluxes than the corresponding smaller substrate (0.22).

FIG. 2 graphically shows the data presented in Table 1. Plotted are the porosimetry peak bubble point (BP) vs. the rejection of T70 Dextrans for the membranes produced on the three types of backings. Also shown with 12% polymer, 3% LiCl in DMAC solutions and 0.22 Durapore ® coated with 10% polymer, 3% LiCl in DMAC were tested for retention of p. diminuta. The membranes were challenged with 1.3×10$^8$ cells per cm$^2$. Both membranes retained the bacteria. This illustrates that the coating process did not damage the 0.22 based membrane. The improved retention for the 0.45 based membrane is more than would be expected for an ultrafiltration membrane.

EXAMPLE 5

The procedure and apparatus of Example 1 was employed for the production of a series of composite ultrafiltration membranes except for the variations noted in Table 2 below. Additionally, both treated and non-treated microporous membranes were employed in order to determine the effect of treatment with glycerine. The results are set forth below in Table 2.

TABLE 2

| Casting Solution | Substrate | casting speed (fpm) | air gap (inch) | flux (gfd) | peck BP psi |
|---|---|---|---|---|---|
| 10% k741, 3% LiCl | .22 UNTREATED | 15 | 1 | 3610 | 32 |
| | .22 UNTREATED | 15 | 3 | 3490 | 35 |
| | .22 UNTREATED | 13 | 6 | 2895 | 23 |
| 10% k741, 3% LiCl | .45 UNTREATED | 15 | 1 | 7535 | <25 |
| | .45 UNTREATED | 15 | 3 | 7339 | 31 |
| | .45 UNTREATED | 15 | 6 | 7010 | 27 |
| 10% k741, 3% LiCl | .22 TREATED | 15 | ½ | 2130 | 95 |
| | .22 TREATED | 15 | 3 | 2200 | 92 |
| | .22 TREATED | 15 | 6 | 2020 | 82 |
| 10% k741, 3% LiCl | .45 TREATED | 15 | 1 | 7100 | 37 |
| | .45 TREATED | | 3 | 6010 | 35 |
| | .45 TREATED | | 6 | 6580 | 35 |
| 20% k741, 3% LiCl | .45 TREATED | 15 | 3 | 4105 | 58 |
| | .45 TREATED | 15 | 3 | 3500 | 59 |
| | .45 UNTREATED | 15 | 3 | 7000 | 14.5 |
| 10% k741, 3% LiCl | .22 TREATED | 15 | 3 | 4330 | 52 |
| | .22 UNTREATED | 15 | 3 | 3910 | 32 |

As can be seen, treating the polyvinylidene difluoride microporous membrane with glycerine typically resulted in significant increases in the peak bubble point of the ultimate composite ultrafiltration membrane.

EXAMPLE 6

Durapore® microporous membranes having a nominal pore size of 0.65 microns were treated by immersing them in a 30% glycerine/70% isopropanol solution (w/w) and then running the membranes over heated rolls to evaporate the isopropanol. Two coated samples were made using these treated membranes. Coating was done with a knife over roll procedure. The coating solutions were
  (a) 20% Kynar 741, 3% LiCl, balance dimethylacetamide;
  (b) 18% Victrex (ICI) polyethersulfone, 5% LiCl, balance N-methyl pyrrolidione.
The resulting composite membranes were tested as previously described and the results are shown in Table 3 below:

TABLE 3

| Coating Solution | Flux (gfd/psi) | Water bubble point | Cytochrome C rejection (%) |
|---|---|---|---|
| a. | 36 | 80 | 60 |
| b. | 44 | 34 | 75 |

Cyctochrome C testing was done at 25 psi using a 1% buffered solution.

Figure 6:
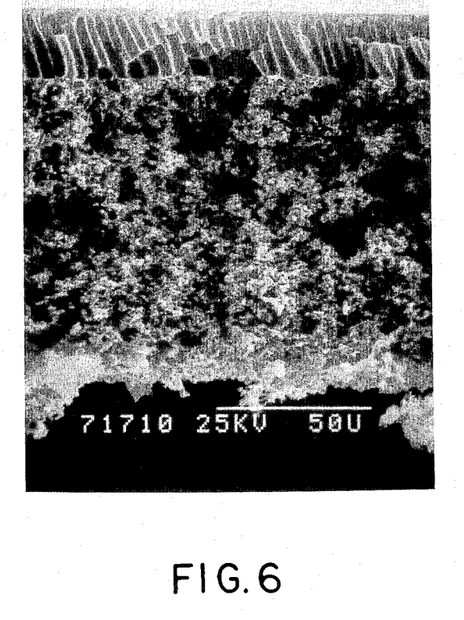
Figure 7:
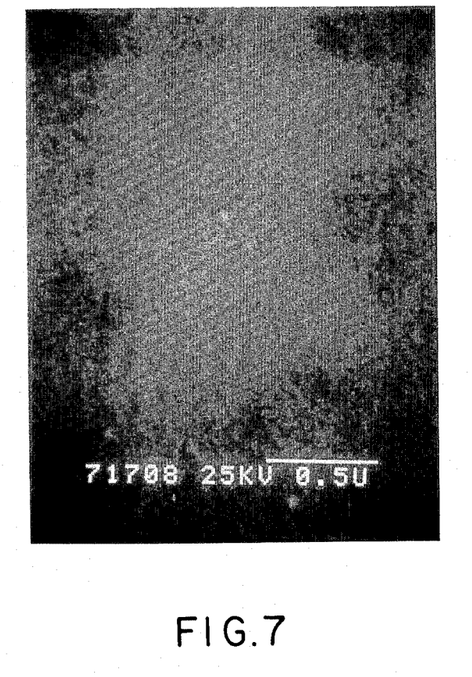

FIG. 6 is a scanning electron photomicrograph of a cross-section of a composite membrane according to procedure (b) above at 700×. FIG. 7 is a scanning electron photomicrograph of the surface of a composite membrane made according to procedure (b) above with 19% Victrex polyethersulfone at 50000×.

The Cytochrome C rejection for the polyethersulfone composite membrane is higher than for the polyvinylidene difluoride (PVDF) composite membrane. Nevertheless, the PVDF membrane has a significantly higher bubble point. This may be due to the transition zone seen in the PVDF membrane.

Equivalents

Those skilled in the art will recognize, or be able to ascertain, using no more than routine experimentation, many equivalents to the specific embodiments of the invention described herein.

These and all other equivalents are intended to be encompassed by the following claims.

We claim:
1. In a method of forming a composite membrane suitable for ultrafiltration by casting a solution of polymer dissolved in a solvent onto a porous support and thereafter precipitating the polymer under conditions whereby an assymetric skinned membrane is formed on the porous support:
  the improvement of employing a microporous membrane as the porous support and treating the microporous membrane prior to casting the solution of polymer and solvent thereon with an agent which results in membrane pore structure upon casting of the solution of polymer dissolved in a solvent onto the microporous membrane support to provide the composite membrane with a porosimitry bubble point significantly increased over that of the same composite membrane formed without treatment of the microporous membrane with said agent.
2. The improvement of claim 1 wherein said agent is a liquid miscible with water.
3. The improvement of claim 2 wherein said agent comprises a glycol or glycerine.
4. The improvement of claim 3 wherein said glycol or glycerine is dissolved in an alcohol solution.
5. The improvement of claim 4 wherein said microporous membrane comprises a polyvinylidene difluoride microporous membrane.
6. The improvement of claim 5 wherein said polymer dissolved in a solvent comprises polyvinylidene difluoride.
7. A composite membrane suitable for ultrafiltration formed by the method of claim 6.
8. The improvement of claim 4 wherein said polymer dissolved in a solvent comprises polysulfone.
9. A composite membrane suitable for ultrafiltration formed by the method of claim 8.
10. A composite membrane suitable for ultrafiltration formed by the method of claim 1.
11. A method for forming a composite membrane suitable for ultrafiltration comprising pretreating a surface of a polyvinylidene difluoride microporous mem- brane by contacting said surface with a solution of glycerine in an alcohol solvent, drying said pretreated surface, casting a solution of polyvinylidene difluoride in a solvent upon the treated surface of the polyvinylidene difluoride microporous membrane and thereafter precipitating polyvinylidene difluoride from the casting solution under conditions sufficient to from an assymetric skinned polyvinylidene difluoride membrane on the treated surface of the microporous membrane and an intermediate membrane zone between the assymetric skinned membrane and microporous membrane, said intermediate membrane zone having a finer pore structure than the microporous membrane.

12. A membrane formed by the method of claim 11.

13. A composite integral membrane comprising a preformed microporous membrane having an average pore diameter of below about 0.65 micrometers and having an assymetric skinned membrane formed therein and an intermediate membrane zone having a pore structure finer than that of said microporous membrane, said integral membrane having a bubble point significantly higher than that of said preformed microporous membrane.

14. A composite integral membrane of claim 13 wherein said composite membrane is formed from polyvinylidene difluoride.

15. A composite integral membrane consisting essentially of a microporous membrane, an assymetric skinned membrane and an intermediate membrane zone of finer pore structure than the microporous membrane, said composite membrane having a porosimetry bubble point of greater than about 60 psi.

16. A method of producing a composite membrane, comprising
  a. applying a solution of glycerine in a solvent to the surface of a preformed polyvinylidene difluoride microporous membrane to wet the surface of said preformed membrane;
  b. drying the wet surface of the preformed microporous membrane to provide a surface thereof treated with glycerine;
  c. dissolving polyvinylidene difluoride in a solvent therefor to form a solution of polyvinylidene difluoride;
  d. applying the solution of polyvinylidene difluoride to the glycerine-treated surface of said preformed polyvinylidene difluoride microporous membrane;
  e. precipitating polyvinylidene fluoride from said solution onto the glycerine treated surface of the preformed polyvinylidene difluoride microporous membrane under conditions whereby an assymetric skinned membrane of polyvinylidene difluoride is formed on the microporous membrane and an intermediate membrane zone having a pore structure finer than that of the microporous membrane is additionally formed to provide a composite polyvinylidene difluoride membrane having a porosimetry bubble point significantly increased over that of the preformed polyvinylidene difluoride microporous membrane.

17. A composite polyvinylidene difluoride membrane formed by the process of claim 16.

* * * * *